(12) United States Patent
Yano (10) Patent No.: US 9,164,359 B2
(45) Date of Patent: Oct. 20, 2015

(54) IMAGING APPARATUS INCLUDING A WIRELESS COMMUNICATION APPARATUS, AND CAMERA SYSTEM

(75) Inventor: Shinichiro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/366,163

(22) Filed: Feb. 3, 2012

(65) Prior Publication Data

US 2012/0200723 A1 Aug. 9, 2012

(30) Foreign Application Priority Data

Feb. 8, 2011 (JP) ................................ 2011-025257

(51) Int. Cl.
*H04N 5/225* (2006.01)
*G03B 15/05* (2006.01)
*G03B 7/16* (2014.01)
*H04N 5/235* (2006.01)

(52) U.S. Cl.
CPC ........ *G03B 15/05* (2013.01); *G03B 7/16* (2013.01); *H04N 5/2256* (2013.01); *H04N 5/2354* (2013.01)

(58) Field of Classification Search
CPC ... H04N 5/2256; H04N 5/2354; G03B 15/05; G03B 7/16
USPC .......................... 348/370, 371; 396/180–195
See application file for complete search history.

(56) References Cited

U.S. PATENT DOCUMENTS

| 6,404,987 B1 * | 6/2002 | Fukui ............................... 396/56 |
| 2002/0009296 A1 * | 1/2002 | Shaper et al. ................... 396/56 |
| 2004/0036774 A1 * | 2/2004 | Nichols et al. ............. 348/207.1 |
| 2004/0151487 A1 | 8/2004 | Iwasaki |
| 2004/0240868 A1 | 12/2004 | Iwasaki |
| 2005/0219405 A1 | 10/2005 | Ichihara |
| 2005/0281549 A1 * | 12/2005 | Shih et al. ........................ 396/57 |
| 2007/0058959 A1 * | 3/2007 | Clark ............................... 396/56 |
| 2007/0237510 A1 * | 10/2007 | Clark ............................... 396/56 |
| 2009/0060488 A1 * | 3/2009 | Okubo ........................... 396/180 |
| 2009/0136225 A1 * | 5/2009 | Gai et al. ....................... 396/180 |

FOREIGN PATENT DOCUMENTS

| EP | 985958 A2 | 3/2000 |
| JP | 05-127215 A | 5/1993 |
| JP | 2000-089305 A | 3/2000 |
| JP | 2000-89306 A | 3/2000 |
| JP | 2001-242511 A | 9/2001 |
| JP | 2005-106890 A | 4/2005 |
| JP | 2006-113357 A | 4/2006 |
| JP | 2010-185958 A | 8/2010 |

* cited by examiner

*Primary Examiner* — Twyler Haskins
*Assistant Examiner* — Dwight C Tejano
(74) *Attorney, Agent, or Firm* — Canon USA, Inc. IP Division (57) ABSTRACT

An imaging apparatus, which is capable of performing wireless communication with a light emitting apparatus via a wireless communication unit using a radio wave, includes a light metering unit configured to meter light of an object, a calculation unit configured to calculate a main light emission amount of the light emitting apparatus based on a light metering value acquired by metering the light, and a control unit configured to perform control such that at least a part of a communication operation of the wireless communication unit with the light emitting apparatus is performed during a light metering operation for acquiring the light metering value to be used when the calculation unit calculates the main light emission amount.

5 Claims, 6 Drawing Sheets

IMAGING APPARATUS INCLUDING A WIRELESS COMMUNICATION APPARATUS, AND CAMERA SYSTEM

BACKGROUND OF THE INVENTION

1. Field of the Invention

The present invention relates to an imaging apparatus that performs wireless communication with a light emitting apparatus by using radio waves.

2. Description of the Related Art

Conventionally, there has been known a camera system that performs flash photography by using a camera and a flash apparatus disposed remotely from the camera. Japanese Patent Application Laid-Open No. 2000-89306 discusses a technique for transmitting a light pulse signal by a camera to a flash apparatus to control the flash apparatus.

Further, for example, Japanese Patent Application Laid-Open No. 05-127215 discusses a technique for calculating an amount of main light emission of a flash apparatus based on a light metering value when the flash apparatus performs preliminary light emission and a light metering value when the flash apparatus emits no light to achieve excellent flash photography. However, if the camera system discussed in Japanese Patent Application Laid-Open No. 2000-89306 calculates an amount of main light emission of the flash apparatus disposed remotely from the camera according to the method discussed in Japanese Patent Application Laid-Open No. 05-127215, a following problem arises.

Figure 6:
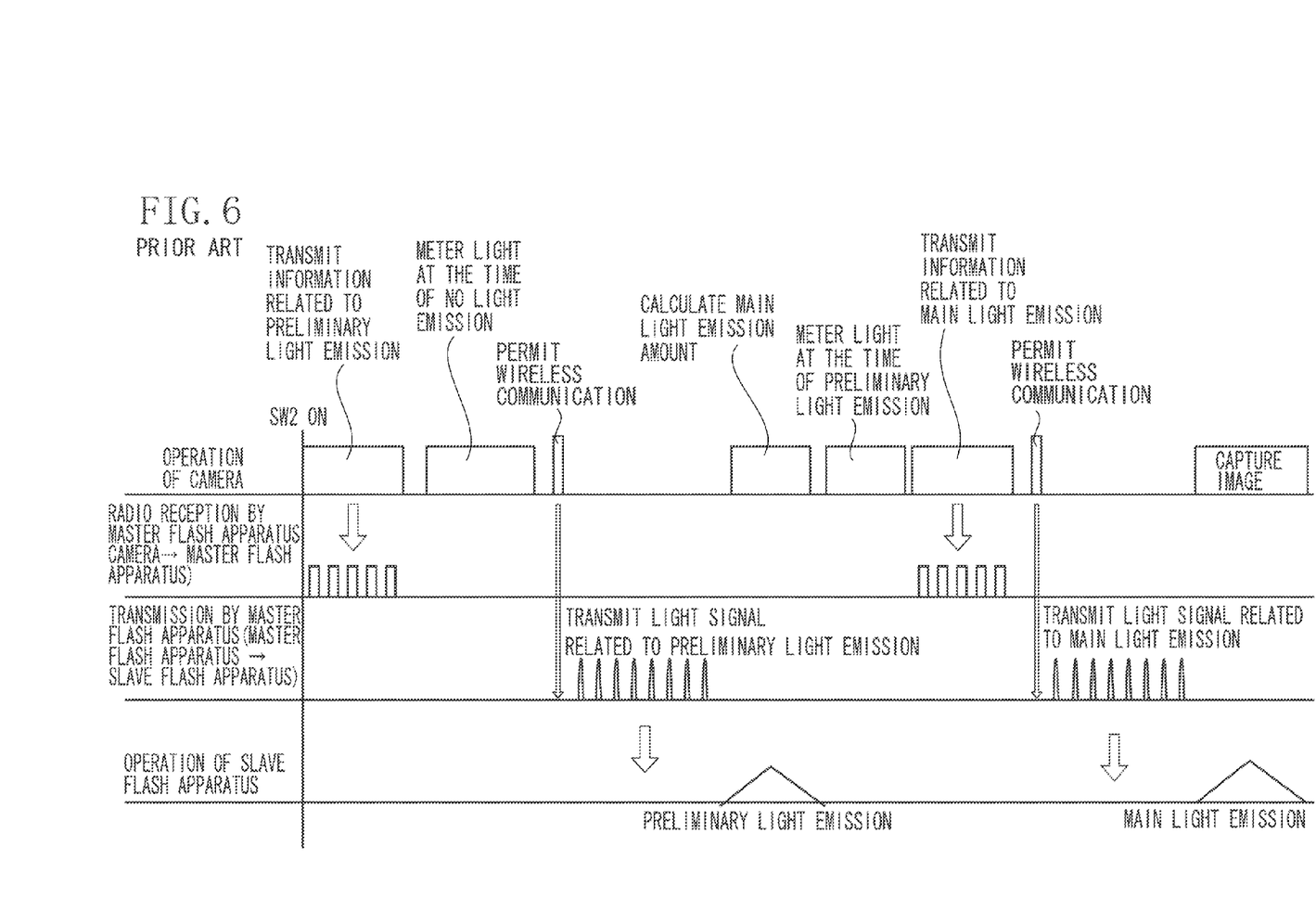
FIG. 6 illustrates timing of each operation from an issuance of an imaging start instruction given from a user to an actual start of an imaging operation according to a conventional camera system.

FIG. 6 illustrates timing of each operation from an issuance of an imaging start instruction from a user to an actual start of an imaging operation, in a camera system that performs flash photography by using a camera and a flash apparatus disposed remotely from the camera. In particular, in the system illustrated in FIG. 6, a flash apparatus mounted on the camera (hereinafter referred to as "master flash apparatus") transmits a light signal to the flash apparatus disposed remotely from the camera (hereinafter referred to as "slave flash apparatus").

In calculating a main light emission amount of the slave flash apparatus according to the method discussed in Japanese Patent Application Laid-Open No. 05-127215, the operations are performed in the following order.

First, the camera meters light when the slave flash apparatus emits no light to acquire a light metering value at the time of no light emission. Then, the master flash apparatus transmits a light signal of preliminary light emission to the slave flash apparatus, so as to cause the slave flash apparatus to perform preliminary light emission. Then, upon receiving the light signal of preliminary light emission, the slave flash apparatus performs preliminary light emission, and the camera meters light in synchronization with the preliminary light emission of the slave flash apparatus, thereby acquiring a light metering value at the time of preliminary light emission.

The camera calculates an amount of main light emission of the slave flash apparatus based on the light metering value at the time of no light emission, and the light metering value at the time of preliminary light emission acquired in the above-mentioned manner.

After the calculation of a main light emission amount of the slave flash apparatus, the camera transmits a light signal indicating information related to main light emission of the slave flash apparatus (an amount of main light emission, timing of main light emission, and duration of main light emission) via the master flash apparatus. Further, the camera transmits a light signal instructing main light emission, and captures an image in synchronization with the main light emission of the slave flash apparatus.

As understood from the above description, if a camera calculates an amount of main light emission of a slave flash apparatus and then captures an image while causing the slave flash apparatus to emit light according to the method discussed in Japanese Patent Application Laid-Open No. 05-127215, the camera should transmit, for example, an instruction for preliminary light emission and information about main light emission to the slave flash apparatus. Further, a camera system including a plurality of slave flash apparatuses should perform the above-described processing regarding calculation of a main light emission amount for each of the slave flash apparatuses.

However, a camera cannot transmit, for example, an instruction for preliminary light emission and information about main light emission to a slave flash apparatus while metering light, since such an instruction and information are transmitted in the form of a light signal.

Therefore, if a camera calculates an amount of main light emission of a slave flash apparatus and then captures an image while causing the slave flash apparatus to emit light according to the method discussed in Japanese Patent Application Laid-Open No. 05-127215, a delay time from an issuance of an imaging start instruction to an actual start of an imaging operation becomes longer, compared to a camera that captures an image while causing only a master flash apparatus to emit light.

SUMMARY OF THE INVENTION

According to an aspect of the present invention, an imaging apparatus, which is capable of performing wireless communication with a light emitting apparatus via a wireless communication unit using a radio wave, includes a light metering unit configured to meter light of an object, a calculation unit configured to calculate a main light emission amount of the light emitting apparatus based on a light metering value acquired by metering the light, and a control unit configured to perform control such that at least a part of a communication operation of the wireless communication unit with the light emitting apparatus is performed during a light metering operation for acquiring the light metering value to be used when the calculation unit calculates the main light emission amount.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
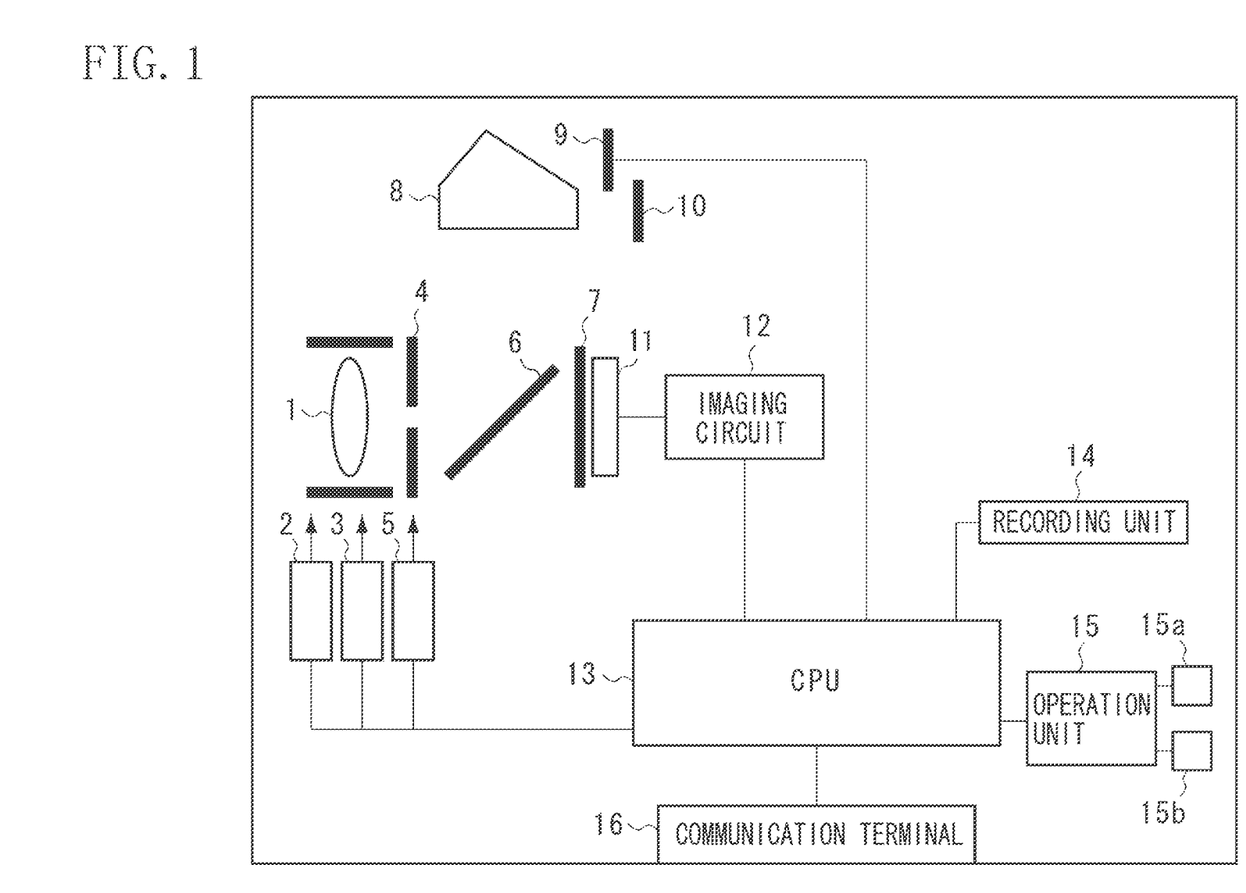
FIG. 1 is a block diagram illustrating an overview of a configuration of a camera according to an exemplary embodiment of the present invention.

FIG. 1 is a block diagram illustrating an overview of a configuration of a camera which is an imaging apparatus according to an exemplary embodiment of the present invention, and mainly illustrates blocks related to this exemplary embodiment. The camera according to the present exemplary embodiment is configured in such a manner that a lens unit is detachably mounted on a camera main boy. However, for convenience of description, the present exemplary embodiment will be described assuming that the lens unit is integrally mounted on the camera main body.

Referring to FIG. 1, an automatic focus (AF) drive unit 2 performs automatic focus control by driving a photographic lens 1. The AF drive unit 2 includes, for example, a direct-current (DC) motor or a stepping motor, and focuses the camera on a desired area in an image frame by changing the focus lens position of the photographic lens 1 under the control of a central processing unit (CPU) 13 which will be described later.

A zoom drive unit 3 performs focal length control by driving the photographic lens 1. The zoom drive unit 3 includes, for example, a DC motor or a stepping motor, and adjusts the focal length of the photographic lens 1 by changing a variable power lens position of the photographic lens 1 under the control of the CPU 13 which will be described later.

A diaphragm 4 adjusts an amount of light incident on an image sensor 11, which will be described later, and a diaphragm drive unit 5 drives the diaphragm 4. The diaphragm drive unit 5 changes a diaphragm value by driving the diaphragm 4 based on a diaphragm drive amount calculated by the CPU 13, which will be described later.

A main mirror 6 switches the direction guiding a light flux incident through the photographic lens 1 between the finder side and the image sensor side. In a normal state, the main mirror 6 is arranged so as to guide a light flux to the finder side. When the camera captures an image, the main mirror 6 is lifted up to be retracted from an optical path, which leads to the image sensor 11 so as to guide a light flux to the image sensor side, which will be described later.

A shutter 7 adjusts an exposure time of a light flux incident on the image sensor 11, which will be described later. The shutter 7 runs in front of the image sensor 11, thereby switching the exposure state of the image sensor 11 from a state exposed to light to a state shielded from light, or from a state shielded from light to a state exposed to light.

A light flux reflected by the main mirror 6 to the finder side is incident on a pentagonal prism 8. The light incident on the pentagonal prism 8 is repeatedly reflected within the pentagonal prism 8, and is transmitted to a light metering sensor 9 as well as to a finder 10.

The light metering sensor 9 meters light of an object based on a light flux incident through the photographic lens 1 to acquire a light metering value, and transmits the acquired light metering value to the CPU 13.

The image sensor 11 photoelectrically converts a light flux incident through the photographic lens 1. An imaging circuit 12 converts an electrical signal acquired from the imaging sensor 11 into image data suitable to the CPU 13, which will be described later, and outputs that data.

The CPU 13 calculates exposure control values such as a diaphragm value and a shutter speed based on the light metering value received from the light metering sensor 9. Further, when the camera performs flash photography, the CPU 13 calculates an amount of main light emission of a flash apparatus based on the light metering value received from the light metering sensor 9. Further, the CPU 13 controls each unit based on an output from an operation unit 15, which will be described below.

The operation unit 15 includes, for example, a release button that receives a user's operation to instruct an imaging start. A first switch 15a (hereinafter referred to as "SW1") and a second switch 15b (hereinafter referred to as "SW2") are switches to be turned on or off according to an operation of the release button. When the release button is half pressed, only the SW1 is turned on. In this state, the camera performs an imaging preparation including an automatic focus operation and a light metering operation.

When the release button is fully pressed, both the SW1 and SW2 are turned on. In this state, the camera starts an imaging operation. Then, image data acquired by the imaging operation is recorded onto a recording unit 14.

Further, a user can select various kinds of settings of a slave flash apparatus by operating the operation unit 15. For example, a use can set a light emission mode such as a forcible light emission mode to force the slave flash apparatus to emit light or an automatic light emission control mode for light emission according to the luminance of an object.

A communication terminal 16 communicates with an accessory such as a flash apparatus or a communication apparatus detachably mounted on an accessory shoe.

Figure 2:
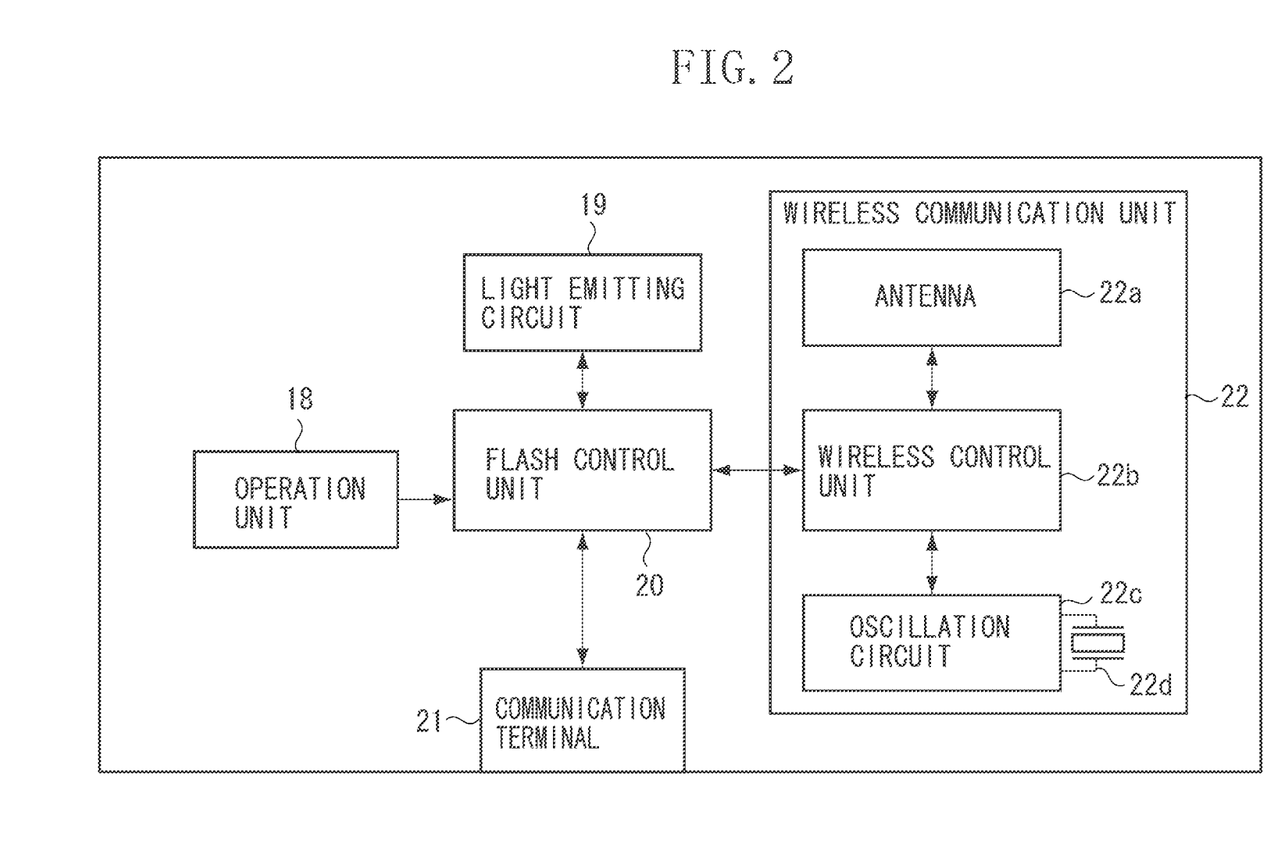
FIG. 2 is a block diagram illustrating an overview of a configuration of a flash apparatus according to the exemplary embodiment of the present invention.

FIG. 2 is a block diagram illustrating an overview of a configuration of a flash apparatus serving as a light emitting apparatus in the camera system according to the present exemplary embodiment, and mainly illustrates blocks related to the present exemplary embodiment. In the following, the present exemplary embodiment will be described assuming that both a flash apparatus mounted on the camera (hereinafter referred to as "master flash apparatus") and a flash apparatus disposed remotely from the camera without being mounted on the camera (hereinafter referred to as "slave flash apparatus") are configured as illustrated in FIG. 2.

An operation unit 18 provides an output according to various operations of a user. A light emitting circuit 19 performs an operation related to light emission such as a charging operation and a light emitting operation, according to a signal from a flash control unit 20. The flash control unit 20 controls each unit of the flash apparatus. Further, the flash control unit 20 communicates via a communication terminal 21 with the camera on which the flash apparatus is mounted.

A wireless communication unit 22 performs wireless communication with an external apparatus using radio waves, and includes several units. An antenna 22a carries out transmission and reception in wireless communication, and transmits data received from a communication partner to a wireless control unit 22b. Further, the antenna 22a receives data from the wireless control unit 22b, and transmits it to a communication partner. An oscillation circuit 22c shapes a waveform of a clock signal generated by a crystal oscillator 22d connected thereto, and outputs the shaped clock signal to the respective circuits of the wireless communication unit 22, thereby achieving a synchronized state in the wireless communication unit 22.

Figure 3:
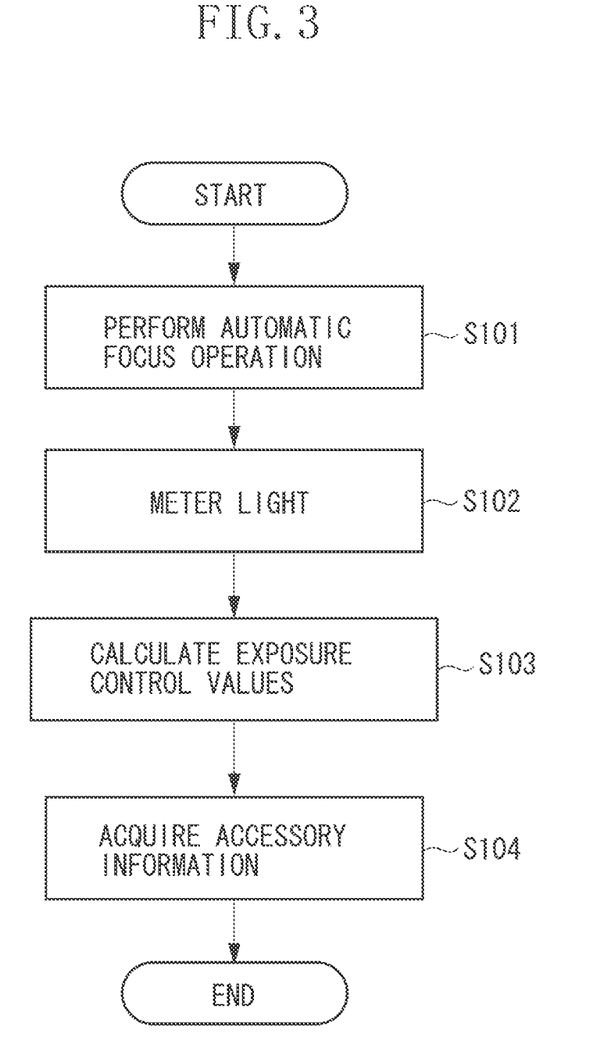
FIG. 3 illustrates an imaging preparation operation of the camera according to the exemplary embodiment of the present invention.

Next, an operation of the camera at the time of imaging according to the present exemplary embodiment will be described with reference to FIGS. 3 and 4. FIG. 3 illustrates an imaging preparation of the camera according to the present exemplary embodiment. When the release button of the operation unit 15 is half pressed and only the SW1 is turned on, each process is started.

When only the SW1 is turned on, in step S101, the camera performs an automatic focus operation as a first step of the imaging preparation. The automatic focus operation is an operation to focus the camera on a desired area in an image frame by changing the focus lens position of the photographic lens 1 using the AF drive unit 2. The CPU 13 controls this automatic focus operation.

Next, in step S102, the camera meters light by the light metering sensor 9 to acquire a light metering value. In the present exemplary embodiment, a light metering time is a time period including an exposure time for light metering and a time taken to read a signal acquired by the exposure. A light metering operation is an operation performed during this light metering time.

Next, in step S103, the CPU 13 calculates exposure control values such as a diaphragm value and a shutter speed to be used in an imaging operation based on the light metering value acquired in step S102.

Next, in step S104, in a case where the camera includes an accessory such as a flash apparatus or a communication apparatus mounted on the accessory shoe of the camera, the camera receives information of the mounted accessory via the communication terminal 16 during this imaging preparation operation. For example, if the mounted accessory is a flash apparatus, the camera receives information indicating, for example, the setting of the light emission mode, whether the flash apparatus uses a slave flash apparatus, and whether the flash apparatus can perform wireless communication with an external apparatus using radio waves.

The processes from the above-described steps S101 to S104 are periodically performed until the SW2 is turned on, as long as the SW1 is kept in a turned-on state.

Figure 4:
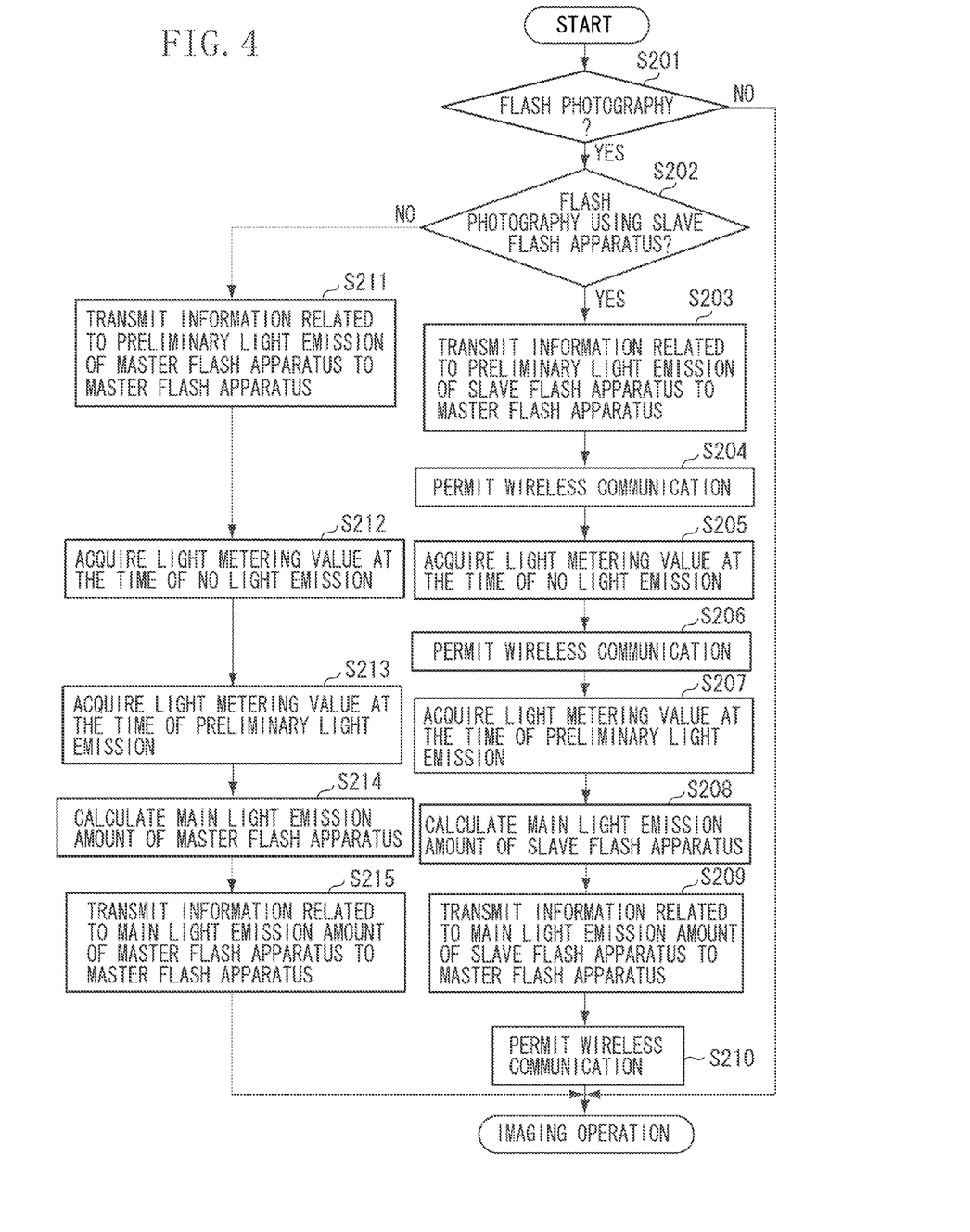
FIG. 4 illustrates a flash photography operation of the camera according to the exemplary embodiment of the present invention.

FIG. 4 illustrates a flash photography operation of the camera according to the present exemplary embodiment. When the release button of the operation unit 15 is fully pressed and both the SW1 and SW2 are turned on, each process is started.

First, in step S201, the CPU 13 determines whether the camera is supposed to perform flash photography. The CPU 13 determines whether the camera is supposed to perform flash photography based on, for example, the light metering value acquired in step S102, the light emission mode set by a user through the operation unit 15, and the information acquired in step S104. For example, if the forcible light emission mode is selected, the CPU 13 determines that the camera is supposed to perform flash photography. If the automatic light emission control mode is selected, the CPU 13 determines that the camera is supposed to perform flash photography on the condition that the luminance of the object based on the light metering value acquired in step S102 is lower than a predetermined value.

If the camera is not supposed to perform flash photography (NO in step S201), the camera starts an imaging operation without performing step S202 and the steps thereafter illustrated in FIG. 4.

If the camera performs flash photography (YES in step S201), the processing proceeds to step S202. In step S202, the CPU 13 determines whether the camera performs flash photography using the slave flash apparatus. The CPU 13 determines whether the camera performs flash photography using the slave flash apparatus, based on, for example, the setting selected by a user through the operation unit 15, and the information acquired in step S104.

If the camera performs flash photography using the slave flash apparatus (YES in step S202), in step S203, the CPU 13 transmits information related to preliminary light emission of the slave flash apparatus to the master flash apparatus via the communication terminal 16. This information related to preliminary light emission is information indicating a light emission amount and a light emission time of the slave flash apparatus when the slave flash apparatus performs preliminary light emission. Further, the CPU 13 transmits information related to main light emission determined before execution of the preliminary light emission, which will be described later, together with the information related to preliminary light emission.

Next, in step S204, the CPU 13 permits the master flash apparatus to perform wireless communication with the slave flash apparatus. Upon receiving the permission from the camera for wireless communication with the slave flash apparatus, the master flash apparatus starts to transmit data based on the information related to preliminary light emission acquired in step S203.

After permitting wireless communication in step S204, in step S205, the camera meters light to acquire a light metering value at the time of no light emission (first light metering value). The CPU 13 controls the start timing of at least one of the data transmission operation and the light metering operation so that at least a part of the data transmission operation from the master flash apparatus to the slave flash apparatus is performed during the light metering operation for acquiring this light metering value at the time of no light emission.

In this way, the present exemplary embodiment transmits data to the slave flash apparatus during the light metering operation, thereby completing the both operations in a shorter time, compared to a case of performing the light metering operation and the data transmission operation to the slave flash apparatus where these operations do not overlap each other. It should be noted that the present exemplary embodiment transmits data to the slave flash apparatus using radio waves, and therefore can acquire a correct light metering value despite the data transmission during the light metering operation.

Next, in step S206, the CPU 13 permits the master flash apparatus to perform wireless communication with the slave flash apparatus. Upon receiving the permission from the camera for wireless communication with the slave flash apparatus, the master flash apparatus starts to transmit data related to main light emission to the slave flash apparatus. The data related to main light emission transmitted at this time is data related to the information that is determined before the execution of preliminary light emission and is acquired in step S203. For example, this data is data indicating how main light emission is performed, such as whether main light emission is performed in a flashlight manner or in a flatly emitting manner. As another example, this data may be, for example, data related to the light emission timing of main light emission, namely a first curtain synchronization mode, in which main light emission is performed in synchronization with the start of an exposure when the camera captures an image, or a second curtain synchronization mode, in which main light emission is performed in synchronization with the end of the exposure when the camera captures an image.

After permitting wireless communication in step S206, in step S207, the camera meters light to acquire a light metering value at the time of preliminary light emission (second light metering value). The CPU 13 controls the timing so that at least a part of the data transmission operation from the master flash apparatus to the slave flash apparatus is performed during the light metering operation for acquiring this light metering value at the time of preliminary light emission. The present exemplary embodiment can reduce an amount of the data related to main light emission to be transmitted after the execution of preliminary light emission by transmitting the data related to the information determined before the execution of preliminary light emission among the data related to main light emission at this timing. Therefore, the present exemplary embodiment can reduce the time required for the communication with the slave flash apparatus after the execution of preliminary light emission. It should be noted that, in this case, as is the case with step S207, the present exemplary embodiment transmits data to the slave flash apparatus using radio waves, and therefore, can acquire a correct light metering value even if the data is transmitted during the light metering operation.

Next, in step S208, the CPU 13 calculates an amount of main light emission of the slave flash apparatus by a known method based on the light metering value at the time of no light emission acquired in step S205, and the light metering value at the time of preliminary light emission acquired in step S207.

Then, in step S209, the CPU 13 transmits the information related to the main light emission amount of the slave flash apparatus calculated in step S208 to the master flash apparatus via the communication terminal 16.

Next, in step S210, the CPU 13 permits the master flash apparatus to perform wireless communication with the slave flash apparatus. Upon receiving the permission from the camera for wireless communication with the slave flash apparatus, the master flash apparatus starts to transmit data based on the information related to the main light emission amount acquired in step S209 to the slave flash apparatus. As discussed above, the present exemplary embodiment has already transmitted the data related to the information determined before the execution of preliminary light emission among the data related to main light emission during the light metering operation for acquiring the light metering value at the time of preliminary light emission, so that the time required for the data transmission can be reduced at this time.

After that, the camera starts an imaging operation, and performs flash photography while causing the slave flash apparatus to emit light.

Returning to the determination in step S202, if the CPU 13 determines that the camera is not supposed to perform flash photography using the slave flash apparatus (NO in step S202), the camera omits the processes related to wireless communication in the flowchart illustrated in FIG. 4, since wireless communication with the slave flash apparatus is unnecessary. More specifically, the camera omits, for example, the permission for the master flash apparatus to perform wireless communication with the slave flash apparatus, and the data transmission operation from the master flash apparatus to the slave flash apparatus, which are performed in steps S204, S206 and S209.

In flash photography without use of the slave flash apparatus, the camera performs flash photography while causing only the master flash apparatus to emit light. Therefore, in step S211, the CPU 13 transmits the information related to preliminary light emission of the master flash apparatus to the master flash apparatus via the communication terminal 16.

Then, in step S212, the camera acquires a light metering value at the time of no light emission, and in step S213, the camera acquires a light metering value when the master flash apparatus performs preliminary light emission. In step S214, the CPU 13 calculates an amount of main light emission of the master flash apparatus based on the light metering values acquired in steps S212 and S213. In step S215, the CPU 13 transmits the data related to main light emission of the master flash apparatus to the master flash apparatus via the communication terminal 16, and performs flash photography while causing the master flash apparatus to emit light.

Figure 5:
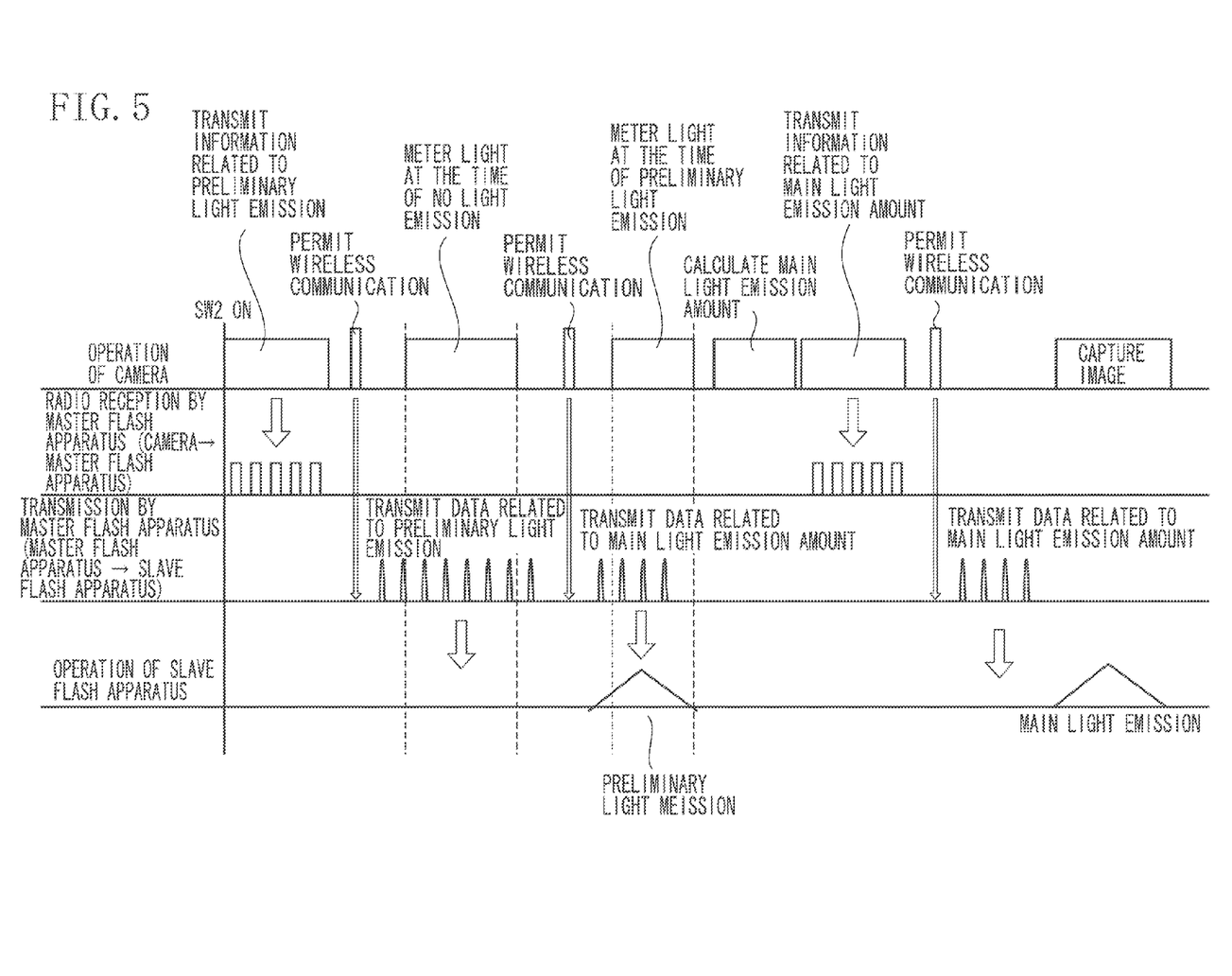
FIG. 5 illustrates timing of each operation from an issuance of an imaging start instruction given from a user to an actual start of an imaging operation according to the exemplary embodiment of the present invention.

Next, the timing of each of the operations when the camera performs flash photography while causing the slave flash apparatus to emit light will be described with reference to FIG. 5.

When the release button is fully pressed and both the SW1 and SW2 are turned on, the CPU 13 transmits the information related to preliminary light emission to the master flash apparatus via the communication terminal 16 (step S203). Next, the CPU 13 permits the master flash apparatus to perform wireless communication with the slave flash apparatus (step S204). Upon receiving the permission from the camera for wireless communication with the slave flash apparatus, the master flash apparatus starts to transmit the data based on the information related to preliminary light emission acquired from the camera, to the slave flash apparatus.

After permitting wireless communication, the camera meters light to acquire a light metering value at the time of no light emission (S205). At this time, the CPU 13 controls the timing so that at least a part of the data transmission operation from the master flash apparatus to the slave flash apparatus is performed during the light metering operation for acquiring the light metering value at the time of no light emission. As a result, the present exemplary embodiment can complete the both operations in a shorter time, compared to a case of performing the light metering operation and the data transmission operation to the slave flash apparatus where these operations do not overlap each other. Further, the light metering operation for acquiring the light metering value at the time of no light emission does not have to be started after the issuance of the permission for wireless communication, and the permission for wireless communication may be issued during the light metering operation.

After that, the CPU 13 permits the master flash apparatus to perform wireless communication with the slave flash apparatus again (step S206). Then, upon receiving the permission from the camera for wireless communication with the slave flash apparatus, the master flash apparatus starts to transmit the data based on the information related to main light emission, which is acquired from the camera and is determined before execution of preliminary light emission, to the slave flash apparatus.

Further, after the master flash apparatus transmits the data based on the information related to preliminary light emission, the slave flash apparatus performs preliminary light emission based on the transmitted data. Then, the camera meters light to acquire a light metering value at the time of preliminary light emission (S207). At this time, the CPU 13 controls the timing so that at least a part of the data transmission operation from the master flash apparatus to the slave flash apparatus is performed during the light metering operation for acquiring the light metering value at the time of preliminary light emission. Accordingly, the time required until a start of an imaging operation can be reduced. It should be noted that the CPU 13 may determine the order of the permission of wireless communication and the light metering operation for acquiring the light metering value at the time of preliminary light emission according to the light emitting timing of preliminary light emission, and the CPU 13 may permit the wireless communication during the light metering operation.

Upon acquiring the light metering value at the time of preliminary light emission, the CPU 13 calculates an amount of main light emission of the slave flash apparatus based on the light metering value at the time of no light emission and the light metering value at the time of preliminary light emission (step S208), and transmits the calculation result to the master flash apparatus via the communication terminal 16 (step S209).

After that, the CPU 13 permits the master flash apparatus to perform wireless communication with the slave flash apparatus again (step S210). Then, upon receiving the permission from the camera for wireless communication with the slave flash apparatus, the master flash apparatus starts to transmit, to the slave flash apparatus, the data based on the information related to the main light emission amount transmitted from the camera.

Then, after the main flash apparatus transmits the data based on the information related to the main light emission amount, the slave flash apparatus performs main light emission based on the transmitted data, and the camera captures an image in synchronization with the main light emission.

In this way, the present exemplary embodiment can reduce the delay time from an issuance of an imaging start instruction to an actual start of an imaging operation by performing at least a part of the data transmission operation to the slave flash apparatus during the light metering operation for calculating a main light emission amount of the slave flash apparatus.

The present exemplary embodiment has been described based on an example that performs wireless communication with the slave flash apparatus via the master flash apparatus mounted on the camera. In another exemplary embodiment, the camera may include a wireless communication unit, and may perform wireless communication with the slave flash apparatus using this wireless communication unit. In still yet another exemplary embodiment, a communication apparatus, connectable to a camera without a wireless communication unit, may be connected to the camera and the camera may perform wireless communication with the slave flash apparatus via this communication apparatus. Further, for example, if the slave flash apparatus does not include a built-in wireless communication unit, a communication apparatus may be attached to the slave flash apparatus, and the camera and the slave flash apparatus may perform wireless communication with each other via this communication apparatus. In other words, the present exemplary embodiment can be carried out by any configuration wherein at least a part of the wireless communication operation between the imaging apparatus and the flash apparatus is performed during the light metering operation of the imaging apparatus. Further, the processing that the CPU 13 performs in the present exemplary embodiment may be partially performed by a CPU of the master flash apparatus or the communication apparatus.

Further, the present exemplary embodiment has been described based on a camera system including a single slave flash apparatus. However, the present exemplary embodiment can be also applied to a camera system including a plurality of slave flash apparatuses.

Further, the present exemplary embodiment performs the data transmission operation to the slave flash apparatus during both the light metering operation at the time of no light emission and the light metering operation at the time of preliminary light emission. However, even when the data transmission operation is executed during only one of the light metering operations, the effect of the present exemplary embodiment can be achieved.

Further, according to the present exemplary embodiment, as an example, the data related to preliminary light emission and the data related to main light emission are transmitted during the light metering operations. However, the present exemplary embodiment may transmit other data if the data is transmitted during the period from an issuance of an imaging start instruction to an actual start of an imaging operation. For example, the present exemplary embodiment may transmit data for confirming whether the slave flash apparatus is in a ready state for light emission, and data for confirming whether the slave flash apparatus is in a ready state for wireless communication.

Further, according to the present exemplary embodiment, as an example, the data transmission operation to the slave flash apparatus is performed during the light metering operation. The present exemplary embodiment can be also applied to a case where a data reception operation from the slave flash apparatus is performed during the light metering operation.

Further, according to the present exemplary embodiment, as an example, the light metering operation is performed at the time of no light emission and the light metering operation is performed at the time of preliminary light emission during the period from an issuance of an imaging start instruction to an actual start of an imaging operation. The present exemplary embodiment can be also applied to a case where only the light metering operation is performed at the time of preliminary light emission during the period from an issuance of an imaging start instruction to an actual start of an imaging operation.

Further, according to the present exemplary embodiment, as an example, the slave flash apparatus is capable of performing wireless communication using radio waves. However, there may be a camera system in which a slave flash apparatus capable of performing wireless communication using radio waves and a slave flash apparatus capable of performing only wireless communication using light signals are mixed. In this case, the present exemplary embodiment can be carried out by controlling the camera to permit the master flash apparatus to perform the communication operation during the light metering operation when the master flash apparatus communicates with the slave flash apparatus capable of performing wireless communication using radio waves. The present exemplary embodiment can be carried out by prohibiting the master flash apparatus to perform the communication operation during the light metering operation when the master flash apparatus communicates with the slave flash apparatus capable of performing only wireless communication using light signals.

Further, the present exemplary embodiment can be applied to a camera that is not configured to acquire a light metering value using the light metering sensor 9, but is configured to acquire a light metering value based on image data acquired by capturing an image using the image sensor. In this case, at least a part of the wireless communication operation between the imaging apparatus side and the light emitting apparatus side may be performed during an exposure of the image sensor for acquiring image data to be used for acquiring the light metering value.

Further, the entire wireless communication operation between the imaging apparatus and the light emitting apparatus does not need to overlap with the light metering operation. A part of the wireless communication operation does not need to be performed during the light metering operation of the imaging apparatus even if the wireless communication operation during the light metering operation of the imaging apparatus is permitted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-025257 filed Feb. 8, 2011, which is hereby incorporated by reference herein in its entirety.

What is claimed is:

1. An imaging apparatus for performing wireless communication with a light emitting apparatus via a wireless communication unit using a radio wave, the imaging apparatus comprising:
    a light metering unit configured to meter light of an object;
    a calculation unit configured to calculate a main light emission amount of the light emitting apparatus based on a first light metering value acquired by metering the light without causing the light emitting apparatus to emit light, and a second light metering value acquired by metering the light with causing the light emitting apparatus to perform preliminary light emission; and
    a control unit configured to perform control such that part of the communication for transmitting information indicating a light emission amount of the light emitting apparatus or a light emission time of the light emitting apparatus is overlapped with an exposure period for metering the light by the light metering unit for acquiring the first light metering value.

2. The imaging apparatus according to claim 1, further comprising an operation unit configured to receive an operation for instructing to start imaging, wherein the light metering unit performs the light metering operation for acquiring the first light metering value and the light metering operation for acquiring the second light metering value after the operation unit receives the instructing operation to start imaging.

3. The imaging apparatus according to claim 1, wherein the light metering unit completes the exposure period for acquiring the first light metering value before the light emitting apparatus performs the preliminary light emission.

4. The imaging apparatus according to claim 1, wherein the control unit controls start timing of at least one of the communication for transmitting the information and the exposure period so that at least the part of the communication is overlapped with the exposure period for acquiring the first light metering value.

5. A camera system including a light emitting apparatus and an imaging apparatus capable of performing wireless communication with each other via a wireless communication unit using a radio wave, the camera system comprising:
    a light metering unit configured to meter light of an object;
    a calculation unit configured to calculate a main light emission amount of the light emitting apparatus based on a first light metering value acquired by metering the light without causing the light emitting apparatus to emit light, and a second light metering value acquired by metering the light with causing the light emitting apparatus to perform preliminary light emission; and
    a control unit configured to perform control such that part of the communication for transmitting information indicating a light emission amount of the light emitting apparatus or a light emission time of the light emitting apparatus is overlapped with an exposure period for metering the light by the light metering unit for acquiring first light metering value.

* * * * *